INVENTORS.
George Baum
Warren M. Wise

BY Gerhard K. Adam

ATTORNEY

United States Patent Office 3,598,713
Patented Aug. 10, 1971

3,598,713
POTASSIUM ION SENSITIVE ELECTRODE
George Baum, Corning, and Warren M. Wise, Big Flats, N.Y., assignors to Corning Glass Works, Corning, N.Y.
Filed June 3, 1969, Ser. No. 830,040
Int. Cl. G01n 27/46
U.S. Cl. 204—195                                    11 Claims

ABSTRACT OF THE DISCLOSURE

An electrode for measuring the concentration of potassium ions in an aqueous solution wherein the sensing portion is a liquid organic phase containing a potassium substituted tetraphenylborate dissolved in a suitable organic solvent.

---

Heretofore glass electrodes for selectively measuring potassium ionic activity in the presence of sodium ions have been known and are described in U.S. Pat. 2,829,090, issued to G. Eisenman et al. The electrode is formed from a potassium selective glass membrane containing about 27 mole percent sodium oxide, 4 mole percent aluminum oxide and the remainder silica. These electrodes have selectivities for potassium ions over sodium ions of the order up to about 10:1.

A totally different approach in making electrodes was discovered by J. W. Ross and is disclosed in U.S. Pat. 3,429,785. This concept essentially relates to a liquid membrane at which ionic exchange occurs formed at the interface between an organic ion exchanger liquid and an aqueous test solution. The electropotential developed at this interface is sensed by the internal reference electrode and finally recorded on a potentiometer. The organic ion exchanger electrode was further improved by R. J. Settzo et al. as described in U.S. Pat. 3,448,032, by placing an organophilic-hydrophobic porous membrane between the organic ion exchanger liquid and the aqueous test solution. If the membrane material itself is not organophilic-hydrophobic, it is necessary to coat the membrane with a treating agent to impart to the membrane the organophilic-hydrophobic property. For suitable treating agents, see the Settzo et al. patent. This selectively permeable membrane is substantially impermeable to the aqueous phase and preferentially permeable to the organic phase, such that, when the electrode is dipped into an aqueous test solution, the interface at which ion exchange occurs is located in the proximity of the outer surface of the membrane. Another development, the use of ograno-metallic liquid ion exchangers, was discovered by M. S. Frant et al. and disclosed in U.S. Pat. 3,406,102. Typical organometallics recommended are compounds of metals and metalloids such as mercury, arsenic, antimony, lead, tin, bismuth and boron. Most of the organometallic compounds described are useful for forming anion-specific electrodes.

Quite surprisingly we have now found a liquid organic exchanger electrode capable of about 100:1 selectivity for potassium in the presence of sodium ions in an aqueous solution. Thus the electrode is capable of measuring potassium ion activity in the presence of sodium ions without making background corrections. The potassium specific ion electrode has a Nernstian response from as low as $10^{-5}$ molar and a useful pH range of from 3–11. Its response time compares favorably to that of any good glass pH electrode.

In accordance with the present invention we have discovered an electrode for measuring the concentration of potassium ions in an aqueous solution comprising (a) A liquid organic phase containing an ion exchange material having the formula $(C_6H_4X)_4BK$ wherein X is a member selected from the group consisting of chlorine and phenoxy;

(b) A means for so containing the organic phase as to provide an interface for ion exchange contact between said organic phase and the aqueous solution; and (c) An internal reference electrode element in electrical contact with the organic phasee.

This invention is more clearly understood from the following description taken in conjunction with the accompanying drawing in which.

Figure 1:
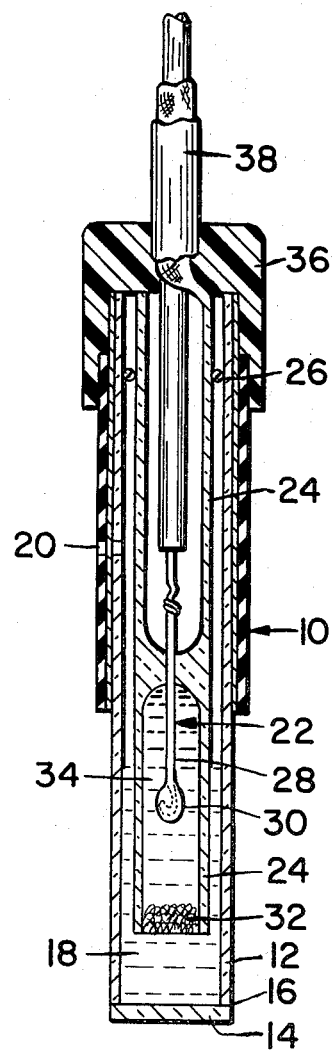
FIG. 1 is a cross-sectional view of a representative electrode formed according to the principles of the present invention.

Referring now to the drawings, in the embodiment illustrated by FIG. 1, the ion exchange electrode 10 of the present invention is comprised of an electrically insulating container such as an outer glass tube 12 having an opening at each end thereof. One end of the glass tube 12 is tightly capped with a substantially chemically inert porous membrane 14 which is attached to the glass tube 12 by a suitable means such as a solid glass 16 or directly by a glass to glass seal. The interior portion of the glass tube 12 is filled with an organic ion exchanger liquid 18. When assembled and in actual use the ion exchanger liquid is in contact with and fills the pores of the membrane 14. In order to permit the ion exchanger liquid 18 to very gradually flow through the pores of the membrane 14, a vent 20 may be placed in the glass tube 12 to prevent the formation of a vacuum. Immersed directly in the ion exchanger liquid 18 and electrical contact therewith is an internal reference electrode 22 which is preferably of the silver-silver chloride type. The internal reference electrode 22 is made up of an inner glass tube 24 held in place by means of an O-ring 26, a platinum wire 28 and a silver-silver chloride coating 30 and a salt bridge 34 consisting of saturated potassium chloride solution which may be gelled with gelatinous silica or agar. Alternatively, the salt bridge 34 may consist of a saturated sodium chloride solution to avoid contamination of the sample by potassium ions. This substitution results in a shift of the EMF in a positive direction. A plug 32 of a suitable inert material such as glass wool soaked in a salt bridge solution can be placed at the bottom of the glass tube 22 to enhance the mechanical stability. The end of the tube 12 is suitably capped by lid 36 which acts both as a closure and a support for electrically conductive lead 38 which forms part of the internal electrode 22. The electrode of FIG. 1 is employed by contacting the outer surface of the membrane 14 with the aqueous test solution. Membrane 14 provides a mechanical support which retains the ion exchange liquid 18 within the tube 12 while also permitting the formation of an active ion exchange liquid-liquid interface on the outer surface of the membrane 22 between the ion exchange liquid and the aqueous test solution.

Figure 2:
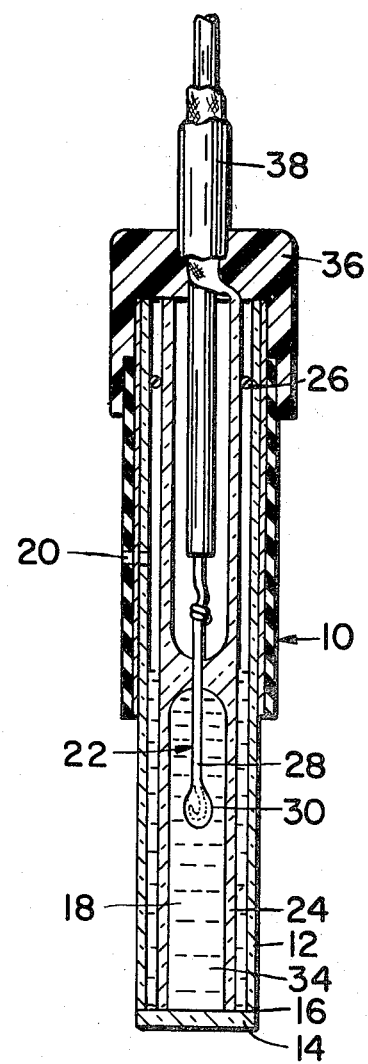
FIG. 2 is a cross-sectional view of another embodiment of an electrode formed according to the principles of the present invention.

Referring now to FIG. 2 this embodiment is similar to that of FIG. 1 and has like parts designated by identical numerals, but is different in that the inner glass tube 24 is attached directly to the porous membrane 14 by means of solder glass 16. In this embodiment the inner salt solution 34 (not gelled) is separated from the ion exchanger liquid 18 by means of the porous membrane 14. The ion exchanger liquid 18 flows downward and laterally into the pores of the membrane 14 which being an organophilic-hydrophobic layer between the aqueous test solution 40 and the internal salt solution 34 prevents the passage of an aqueous material either into or out of the electrode 10.

The ion exchangers useful in the novel potassium ion sensitive electrodes are potassium substituted tetraphenylborates. These compounds may be represented by the general formula $(C_6H_4X)BK$ wherein X is a member selected from the group consisting of chlorine and phenoxy. An essential property of the ion exchanger is that it must be water insoluble. Thus, the potassium salt which is water insoluble is to be used, rather than the sodium salt which is water soluble. Electrodes made with potassium tetraphenylborate dissolved in a 1:1 mixture of tri-n-butyl phosphate and 2-hendecanone were stable and have fast response times. However, the selectivities for potassium ions over sodium ions are poorer than the available glass electrodes. In general, the nonsubstituted salts are very insoluble in the commonly used organic solvents for preparing liquid ion exchanger electrodes. Certain substitutions on the phenyl rings of potassium tetraphenylborate were found to enhance the solubility of the salt in common organic solvents. Substitution of methyl, methoxy or chlorine for hydrogen in the para position of just one phenyl ring did not significantly alter the solubility of the alkali salt in organic solvents. However, when chlorine is placed in the para position of each of the four phenyl rings the resulting potassium salt is soluble in a large number of organic solvents such as alcohols, nitrobenzene, di-n-butylphthalate, cyclohexanone and tricresylphosphate. Also substitution of an organic radical such as methyl, methoxy or phenoxy group in each of the four para positions produces potassium salts that are soluble in some of these solvents. However, the tetra-p-methyl and tetra-p-methoxy substituted exchangers produced inferior electrodes. Furthermore, substitution of iodine or bromine produces compounds which are not sufficiently stable, whereas the fluoride compound is difficult to prepare. The only exchangers which have been found to give satisfactory results are the tetra-p-phenoxy and the tetra-p-chloro compounds. Thus, we have limited the exchangers useful in the present invention to potassium tetrakis(p-chlorophenyl)borate and potassium tetrakis(p-phenoxyphenyl)borate.

A very important role in controlling the performance of the organic ion exchange electrode is played by the solvent system. The system must be liquid at room temperature although individual components do not have to be. It must be a good solvent for the ion exchanger and at the same time it must be substantially water immiscible. The solvent should have a high dielectric constant and a viscosity such that the organic phase is able to saturate and pass through the membrane. The latter property can be adjusted by using a mixture of solvents. The preferred solvents for the exchanger are nitroaromatic compounds. These compounds generally have the formula

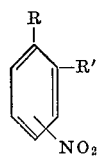

wherein R is hydrogen, alkyl containing 1–14 carbon atoms, lower alkoxy, and alkylcarboxy and R' is hydrogen and methyl. Representative compounds include nitrobenzene; 1,2-dimethyl-4-nitrobenzene; p-hexylnitrobenzene; 1,2-dimethyl-3-nitrobenzene, decyl-p-nitrobenzoate, and octyl-p-nitrophenyl ether. Frequently, the nitroaromatic compounds are used in mixtures such as for example a 1:1 mixture of 1,2-dimethyl-4-nitrobenzene and p-hexyl-nitrobenzene. Higher nitrated solvents, i.e. those containing more than one nitro group, tend to be explosive and should be avoided. The ratio of exchanger to solvent is to a large extent limited by the solubility of the exchanger in the solvent which is usually up to a few percent. Typically the organic phase contains about 1% w./v. of the organometallic ion exchanger in the solvent.

Figure 3:
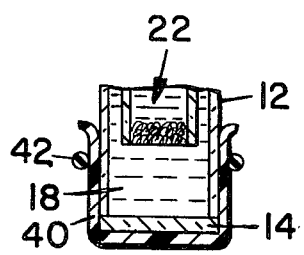
FIG. 3 is a fragmented cross-sectional view of a modified electrode for use in measuring ion concentrations of blood serums.

Referring now to FIG. 3, in measuring the potassium ion concentration of blood serums, the electrode must be further modified in order to give satisfactory potassium ion over sodium ion selectivity. Failure to modify the electrode results in anomalous EMF readings. As illustrated, the electrode has essentially a configuration similar to FIG. 1, although it may also have other configurations such as shown in FIG. 2. The porous organophilic-hydrophobic membrane 14 is attached to the outer tube 12 so as to form a container for the organic ion exchanger liquid 18, and the internal reference electrode 22 is in electrical contact with the exchanger liquid 18. The modification involves placing a dialysis membrane 40, held in place by a suitable means such as an O-ring 42, directly in front of the organophilic-hydrophobic porous membrane 14, to prevent the samples of blood serum from contaminating the liquid organic ion exchanger sensor. An exmaple of a suitable dializer is a cellophane membrane such as used for dializer tubing which has a wall thickness of about 0.008" and an average pore diameter of about 48 A. units. To meet satisfactory selectivity the organophilic-hydrophobic membrane must be placed between the cellophane and the internal reference electrode.

A number of ion exchanger electrode assemblies as illustrated by FIG. 1 and FIG. 2 were formed using an organic phase containing various tetraphenylborate salts and solvents and their behavior was determined as will be described in the following examples.

EXAMPLE I

The ion exchanger, potassium tetrakis(p-chlorophenyl)borate was prepared by the following procedure. To an etheral solution of the Grignard reagent prepared from 0.29 mole (55.5 grams) of 1-bromo-4-chlorobenzene in 125 ml. of anhydrous diethyl ether, a solution of 0.054 mole (12.43 grams) of tri-n-butyl-borate in 125 ml. of ether was added dropwise with stirring over a period of one hour. The reaction flask contents was decanted into approximately 200 ml. of a dilute aqueous sodium chloride solution. The upper ether layer was separated and evaporated to dryness yielding the crude sodium tetrakis(p-chlorophenyl)borate which was dissolved in distilled water and filtered to remove solid impurities. To this solution was added dilute aqueous potassium chloride. The precipitate was filtered, dried and purified by recrystallization from benzene yielding a white amorphous powder which did not melt below 300° C.

A solvent mixture for the exchanger was made from a 1:1 mixture of p-hexylnitrobenzene and 4-nitro-1,2-dimethylbenzene. Into this mixture the solid potassium tetrakis(p-chlorophenyl)borate salt was dissolved to form a 1% w./v. solution.

Construction of the electrode was substantially as shown in FIG. 2. An Ag/AgCl reference electrode was immersed in a saturated KCl solution which contacts the organic ion exchanger liquid at the inside surface of the organophilic-hydrophobic membrane. The sensor also saturates the membrane and makes contact with the aqueous test solution at the outside surface of the membrane at which the potential in millivolts is established by the activity of the cation in the aqueous phase. A saturated calomel electrode was used as the reference for potential measurements.

The electrode selectivity was then determined by responses to KCl and NaCl solutions of different molalities. The results are shown in the lower portion of FIG. 4. The heavy solid line indicates the data for the KCl solutions while the thin solid line is the data for the NaCl solutions. Since the NaCl response does not have a constant slope over the entire range shown, an effective way of determining selectivity is to compare the concentrations of NaCl and KCl required to establish the same EMF. Selectivity values of $K^+/Na^+$ for $10^{-4}$, $10^{-3}$, and $10^{-2}$ molar potassium salt solutions are 55:1, 80:1, and 90:1 respectively in single salt solutions.

EXAMPLE II

Following the procedure of Example I an electrode was prepared using a 1% w./v. of potassium tetrakis(p-phenoxyphenyl)borate in 3 - nitro - 1,2-dimethylbenzene. The results obtained given in millivolt readings for various molality solutions are as follows:

| Molality | Millivolts | |
|---|---|---|
| | KCl | NaCl |
| $10^{-4}$ | −317.0 | −350.0 |
| $10^{-3}$ | −262.7 | −335.0 |
| $10^{-2}$ | −204.1 | −305.0 |
| $10^{-1}$ | −148.6 | −261.0 |
| 1 | −95.8 | −205.6 |

A comparison of the responses to KCl and NaCl solutions indicates that selectivities for $K^+/Na^+$ of 100:1 are obtained.

EXAMPLE III

Following the procedure of Example I an electrode was prepared using a 1% w./v. of sodium tetraphenylborate in decanol. The results obtained given in millivolt readings for various molality solutions are as follows:

| Molality | Millivolts | |
|---|---|---|
| | KCl | NaCl |
| $10^{-4}$ | −171.5 | −168.5 |
| $10^{-3}$ | −150.2 | −157.8 |
| $10^{-2}$ | −109.2 | −131.2 |
| $10^{-1}$ | −66.4 | −100.0 |
| $10^{-0}$ | −24.7 | −70.8 |

Figure 4:
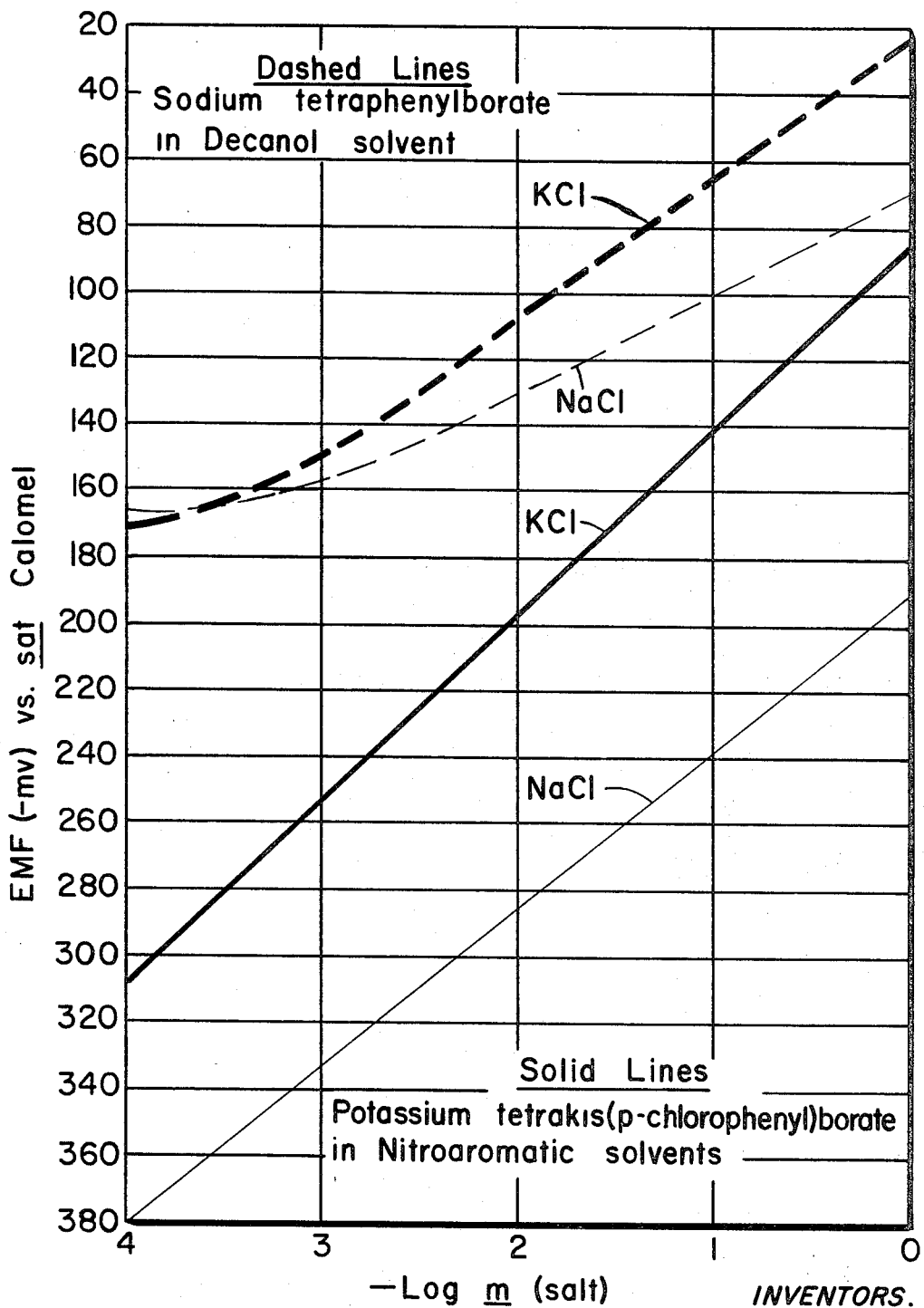
FIG. 4 is a graphic representation of comparative data obtained by using electrodes as discussed hereinafter.

The results have been plotted in the upper portion of FIG. 4. The heavy dashed line indicates the data for the KCl solutions while the thin dashed line indicates the data for the NaCl solutions. It is readily apparent that the selectivity of $K^+/Na^+$ is very poor, less than 10:1, especially as the concentration of $K^+$ decreases. As a matter of fact as the concentration of $K^+$ solution and the $Na^+$ solution reach $10^{-4}$ molal, the electrode is slightly selective to $Na^+/K^+$.

EXAMPLE IV

A number of electrodes were assembled and their responses were measured in aqueous KCl and NaCl solutions. The sensor used was the organic ion exchanger liquid of Example I and the electrode configuration was that shown in FIG. 2 and the modification shown in FIG. 3. Saturated NaCl was used as the internal reference electrolyte for the Ag/AgCl internal reference electrode. Measurements were made with a Corning Model 12 pH meter and a saturated calomel electrode as a reference. The results obtained are summarized as follows:

| Electrode: | Membrane | Salt soln. | Blood serum [a] |
|---|---|---|---|
| A | Figure 2 | Satisfactory | Erroneously high reading.[b] |
| B | Cellophane | Poor selectivity $K^+/Na^+ \leq 10:1$. | Poor selectivity $K^+/Na^+ \leq 10:1$. |
| C | Figure 2 and cellophane. | Satisfactory | Satisfactory. |

[a] Previously analyzed human blood serum.
[b] Reading indicates about a tenfold increase in concentration.

Thus, it is concluded that for satisfactory $K^+/Na^+$ selectivity two partitioning membranes must be used in series in the construction of a liquid ion exchange potassium electrode for measuring $K^+$ ions in blood serums.

A dialysis membrane must be present to prevent the sample of blood serum from contaminating the liquid ion exchange sensor. In addition to maintain satisfactory selectivity, an organophilic-hydrophobic porous membrane must be placed between the dialysis membrane and the internal reference electrode.

We claim:
1. An electrode for measuring the concentration of potassium ions in an aqueous solution comprising:
    (a) a liquid organic phase containing an ion exchange material having the formula $(C_6H_4X)_4BK$, wherein X is a member selected from the group consisting of chlorine and phenoxy,
    (b) a means for so containing the organic phase, as to provide an interface for ion exchange contact between said organic phase and the aqueous solution; and
    (c) an internal reference electrode element in electrical contact with the organic phase.
2. The electrode of claim 1, wherein said material is dissolved in a nitroaromatic solvent.
3. The electrode of claim 2, wherein said solvent has the formula

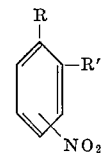

wherein R is a member selected from the group consisting of hydrogen, alkyl containing 1–14 carbon atoms, lower alkoxy and alkylcarboxy, and R′ is a member selected from the group consisting of hydrogen and methyl.
4. The electrode of claim 3, wherein said ion exchange material is potassium tetrakis(p-chlorophenyl)borate.
5. The electrode of claim 3, wherein said ion exchange material is potassium tetrakis(p-phenoxyphenyl)borate.
6. The electrode of claim 3, wherein said solvent is a mixture of at least two nitroaromatic compounds.
7. The electrode of claim 6, wherein said mixture consists of p-hexylnitrobenzene and 4-nitro-1,2-dimethylbenzene.
8. The electrode of claim 2, wherein said means includes a container for said liquid organic phase having an opening at a portion and an organophilic-hydrophobic porous membrane disposed in covering relationship across said opening.
9. The electrode of claim 8, wherein said membrane consists of a ceramic material coated with a treating agent to impart the organophilic-hydrophobic property.
10. The electrode of claim 8, wherein a dialysis membrane is positioned in front of and across said porous membrane.
11. The electrode of claim 10, wherein said dialysis membrane consists essentially of porous cellophane.

References Cited

UNITED STATES PATENTS

| 3,398,066 | 8/1968 | Ilani | 204—1T |
| 3,406,102 | 10/1968 | Frant et al. | 204—195 |
| 3,438,886 | 4/1969 | Ross | 204—195 |
| 3,448,032 | 6/1969 | Settzo et al. | 204—195 |

TIA-HSUNG TUNG, Primary Examiner

U.S. Cl. X.R.

204—1T